United States Patent
Choi et al.

(10) Patent No.: US 9,804,453 B2
(45) Date of Patent: Oct. 31, 2017

(54) DISPLAY DEVICE

(71) Applicant: BOE TECHNOLOGY GROUP CO., LTD., Beijing (CN)

(72) Inventors: Hyunsic Choi, Beijing (CN); Heecheol Kim, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 6 days.

(21) Appl. No.: 14/422,749

(22) PCT Filed: Apr. 25, 2014

(86) PCT No.: PCT/CN2014/076233
§ 371 (c)(1),
(2) Date: Feb. 20, 2015

(87) PCT Pub. No.: WO2015/085698
PCT Pub. Date: Jun. 18, 2015

(65) Prior Publication Data
US 2015/0370137 A1    Dec. 24, 2015

(30) Foreign Application Priority Data
Dec. 10, 2013   (CN) .......................... 2013 1 0673600

(51) Int. Cl.
*G02F 1/1343*    (2006.01)
*G02F 1/1333*    (2006.01)
(Continued)

(52) U.S. Cl.
CPC ...... *G02F 1/134363* (2013.01); *G02F 1/1368* (2013.01); *G02F 1/133345* (2013.01);
(Continued)

(58) Field of Classification Search
CPC ............................................. G02F 1/134363
See application file for complete search history.

(56) References Cited

U.S. PATENT DOCUMENTS

2009/0032819 A1*   2/2009   Lim .................... G02F 1/13458
                                                              257/72
2010/0039592 A1*   2/2010   Wang ................ G02F 1/134363
                                                              349/106

(Continued)

FOREIGN PATENT DOCUMENTS

CN    101997004 A    3/2011
CN    102162955 A    8/2011

(Continued)

OTHER PUBLICATIONS

1st office action issued in Chinese application No. 201310673600.X dated Sep. 25, 2015.

(Continued)

*Primary Examiner* — Edmond Lau
(74) *Attorney, Agent, or Firm* — Nath, Goldberg & Meyer; Joshua B. Goldberg; Christopher Thomas

(57) ABSTRACT

The embodiment of the present invention discloses a display device, which relates to the field of display, may realize low-frequency (low-standing-wave) driving and may prevent the aperture ratio from being reduced as a result of ensuring the charge rate during high-frequency driving. The display device provided by the present invention comprises a first substrate and a second substrate which are assembled with each other to form a cell, wherein the first substrate comprises a first electrode layer, the second substrate comprises a second electrode layer, the first substrate further comprises a third electrode layer arranged on one side, far from the second substrate, of the first electrode layer, and an insulation layer is arranged between the third electrode layer; and the first electrode layer, and the third electrode layer is electrically connected with the second electrode layer. The display device is suitable for being driven at low frequency.

15 Claims, 2 Drawing Sheets

(51) Int. Cl.
*G02F 1/1335* (2006.01)
*G02F 1/1368* (2006.01)
*G02F 1/1339* (2006.01)
*G02F 1/1362* (2006.01)

(52) U.S. Cl.
CPC .. *G02F 1/133512* (2013.01); *G02F 1/133514* (2013.01); *G02F 1/134309* (2013.01); *G02F 1/1339* (2013.01); *G02F 2001/13398* (2013.01); *G02F 2001/134381* (2013.01); *G02F 2001/136222* (2013.01); *G02F 2201/121* (2013.01); *G02F 2202/16* (2013.01)

(56) References Cited

U.S. PATENT DOCUMENTS

2010/0134473 A1* 6/2010 Matsuda ............... G09G 3/3677
   345/213
2011/0151618 A1  6/2011 Yamazaki et al.
2012/0133878 A1* 5/2012 Hirakata ........... G02F 1/133528
   349/141
2014/0034953 A1* 2/2014 Go ..................... G02F 1/13394
   257/59

FOREIGN PATENT DOCUMENTS

| CN | 102209929 A | 10/2011 |
| CN | 102736331 A | 10/2012 |
| CN | 202631914 U | 12/2012 |
| CN | 103365005 A | 10/2013 |
| CN | 103676356 A | 3/2014 |

OTHER PUBLICATIONS

English translation of Written Opinion of PCT/CN2014/076233 from ISR dated Oct. 9, 2014 that was originally provided to the USPTO on Feb. 20, 2015 with the application.

International Patent Application No. PCT/CN2014/076233, International Search Report dated Oct. 9, 2014, thirteen (13) pages.

* cited by examiner

-- Prior Art --

DISPLAY DEVICE

This is a National Phase Application filed under 35 U.S.C. 371 as a national stage of PCT/CN2014/076233, filed Apr. 25, 2014, and claims priority benefit from Chinese Application No. 201310673600.X, filed Dec. 10, 2013, the content of each of which is hereby incorporated by reference in its entirety.

FIELD OF THE INVENTION

The present invention relates to the field of display, and particularly relates to a display device.

BACKGROUND OF THE INVENTION

Generally, when a display device is driven at high frequency (60 Hz, 120 Hz and the like), high storage capacitance Cst influences the charge rate, so the Cst needs to be designed into a relatively small value. However, when the display device is driven at low frequency (below 30 Hz, generally driven at 10 Hz or 5 Hz), the voltage holding ratio (VHR) depends on the magnitude of the Cst, and if the Cst is too low, the normal value may not be maintained, so relatively high Cst is needed during low-frequency driving. For example, if the Cst of pixels is set as 1 during 60 Hz driving, nearly 10 times of Cst is needed when the display device is driven at 6 Hz low frequency (namely the driving frequency is 1/10 of the original). Therefore, if a driving frequency of a display device is changed from a high frequency to a low frequency, the VHR is reduced. Thus, for adapting to high-frequency or low-frequency driving, the pixels are generally respectively designed according to different driving frequencies. Specifically, in order that the charge rate meets the design requirement, small pixel electrodes are designed during high-frequency driving to reduce the Cst, and large pixel electrodes are designed during low-frequency driving to ensure higher Cst, but the shortcoming lies in that the pixel electrodes are small during high-frequency driving and the aperture ratio is correspondingly reduced.

The structure of a novel ADS mode display device is shown in FIG. 1, and the display device is formed by assembling a color filter substrate 10 and an ADS array substrate 20 with each other to form a cell, wherein the color filter substrate 10 includes a substrate 11, and a color filter layer and a common electrode 13 which are arranged on the substrate 11; and the ADS array substrate 20 includes a substrate 21 and pixel electrodes 22 arranged on the substrate 21, wherein the pixel electrodes 22 are slit electrodes, and the common electrode 13 is a plate-type electrode. The novel ADS mode shown in FIG. 1 has an advantage on the aspect of charge rate design during high-frequency driving due to relatively low Cst, but is not suitable for low-frequency driving due to the relatively low Cst.

The above-mentioned ADS mode indicates an Advanced Super Dimensional Switching mode, ADS for short. The principle of the ADS mode lies in that: a multi-dimensional electric field is formed by parallel electric fields generated at edges of the pixel electrodes or the common electrode in the same plane and longitudinal electric fields generated between the pixel electrodes and the common electrode, and all oriented liquid crystal molecules in a liquid crystal cell may be subjected to rotation transformation, so that the liquid crystal working efficiency of a plane orientation system is improved and the transmittance efficiency is improved.

SUMMARY OF THE INVENTION

The embodiment of the present invention provides a display device, which may realize low-frequency (low-standing-wave) driving and may prevent the aperture ratio from being reduced as a result of ensuring the charge rate during high-frequency driving.

To achieve the above-mentioned purpose, the embodiment of the present invention adopts the following technical solutions.

The embodiment of the present invention provides a display device, comprising a first substrate and a second substrate which are assembled with each other to form a cell, wherein the first substrate includes a first electrode layer, the second substrate includes a second electrode layer, the first substrate further includes a third electrode layer arranged on one side, far from the second substrate, of the first electrode layer, moreover, an insulation layer is arranged between the third electrode layer and the first electrode layer, and the third electrode layer is electrically connected with the second electrode layer.

Preferably, a switch is arranged between the third electrode layer and the second electrode layer, and the switch is turned off when the display device is driven at high frequency.

Preferably, the first substrate is a color filter substrate, and the insulation layer is a color filter layer.

Specifically, the color filter layer includes a black matrix and color resisting blocks spaced by the black matrix.

Preferably, the display device further includes a conductive spacer, and the third electrode layer is electrically connected with the second electrode layer through the spacer.

Alternatively, the first substrate is provided with a via hole penetrating through the first electrode layer and the insulation layer, and the spacer is connected to the third electrode layer through the via hole.

Alternatively, the second electrode layer is provided with slit electrodes.

Alternatively, the second electrode layer is a pixel electrode layer, and the slit electrodes are pixel electrodes.

Alternatively, the second substrate is also provided with thin film transistors connected with the pixel electrodes; the first electrode layer is connected with drains of the thin film transistors through the spacer.

Alternatively, the first electrode layer, the second electrode layer and the third electrode layer are all transparent conductive films.

The total thickness of the first electrode layer, the second electrode layer and the third electrode layer is less than 1,000 Å.

In the existing display device, the first and second electrode layers for generating driving electric fields are respectively positioned on the color filter substrate and the array substrate and are relatively far from each other, and the Cst is relatively low, so the existing display device is suitable for being driven at high frequency; in the display device provided by the embodiment of the present invention, the first electrode layer and the third electrode layer which are spaced by the insulation layer are arranged on the first substrate; moreover, the third electrode layer far from the second substrate is electrically connected with the second electrode layer on the second substrate, thus, a first capacitor C1st is formed between the second electrode layer on the second substrate and the first electrode layer, a second capacitor C2st is formed between the first electrode layer and the third electrode layer, and the storage capacitance Cst of the display device is actually C1st+C2st. Accordingly, compared with the prior art, the display device provided by this embodiment, which has high storage capacitance, is suitable for being driven at low frequency. In addition, electrical connection between the third electrode layer 33 and the second electrode layer 42 may be cut off during high-frequency driving, so that the storage capacitance Cst is reduced to ensure the charge rate. Since the Cst is not reduced by using relatively small pixel electrodes, the aperture ratio is not reduced during high-frequency driving.

BRIEF DESCRIPTION OF THE DRAWINGS

To illustrate the technical solutions in the embodiments of the present invention more clearly, a brief introduction on the accompanying drawings which are needed in the embodiments will be given below. Apparently, the accompanying drawings in the description below are merely some of the embodiments of the present invention, based on which other drawings may be obtained by those of ordinary skill in the art without any creative effort.

REFERENCE NUMERALS

10—color filter substrate, 11—substrate, 12—color filter layer, 13—common electrode, 20—array substrate,
21—substrate, 22—pixel electrode;
30—first substrate, 32—first electrode layer, 33—third electrode layer, 34—insulation layer,
35—through via, 40—second substrate, 42—second electrode layer, 44—drain through via,
50—spacer.

DETAILED DESCRIPTION OF THE EMBODIMENTS

A clear and complete description of the technical solutions in the embodiments of the present invention will be given below in combination with the accompanying drawings in the embodiments of the present invention. Apparently, the embodiments described are merely a part, but not all, of the embodiments of the present invention.

For a clear description, similar items are distinguished by adopting terms first, second and the like in the present invention, the terms first, second and the like do not quantitatively limit the present invention, and apparent similar variations or relevant extensions conceived by those skilled in the art according to the contents disclosed by the present invention should fall into the protection scope of the present invention.

Embodiment

Figure 1:
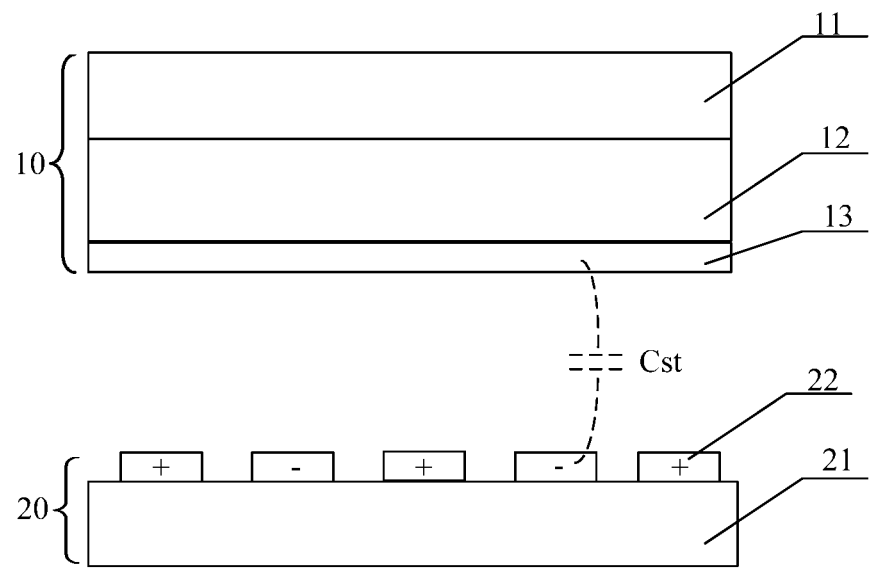
FIG. 1 is a structural schematic diagram of an existing ADS mode display device.
Figure 2:
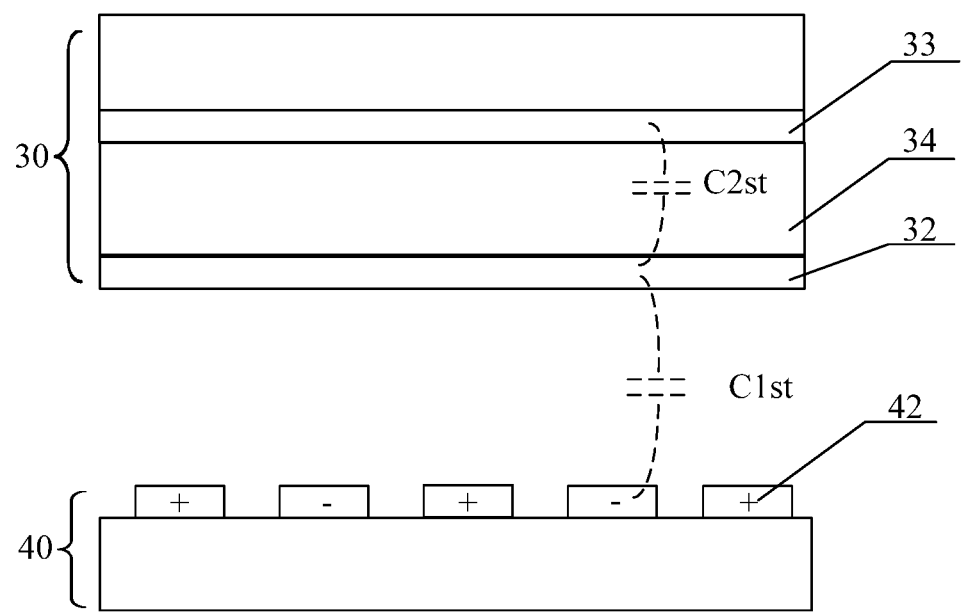
FIG. 2 is a first structural schematic diagram of a display device provided by an embodiment of the present invention.

The embodiment of the present invention provides a display device, as shown in FIG. 2, including a first substrate 30 and a second substrate 40 which are assembled with each other to form a cell, wherein the first substrate 30 includes a first electrode layer 32, the second substrate 40 includes a second electrode layer 42, the first substrate 30 further includes a third electrode layer 33 arranged on one side (namely above the first electrode layer 32), far from the second substrate 40, of the first electrode layer 32, moreover, an insulation layer 34 is arranged between the third electrode layer 33 and the first electrode layer 32, and the third electrode layer 33 is electrically connected with the second electrode layer 42.

In an existing display device, the first and second electrode layers for generating driving electric fields are respectively positioned on a color filter substrate and an array substrate and are relatively far from each other, and Cst is relatively low, so the existing display device is suitable for being driven at high frequency; in the display device provided by the embodiment of the present invention, the first electrode layer 32 and the third electrode layer 33 which are spaced by the insulation layer 34 are arranged on the first substrate 30; moreover, the third electrode layer 33 far from the second substrate 40 is electrically connected with the second electrode layer 42, thus, a first capacitor C1st is formed between the second electrode layer 42 on the second substrate 40 and the first electrode layer 32, a second capacitor C2st is formed between the first electrode layer 32 and the third electrode layer 33, and the storage capacitance Cst of the display device is actually C1st+C2st. Accordingly, compared with the prior art, the display device provided by this embodiment, which has high storage capacitance, is suitable for being driven at low frequency.

In addition, in the prior art, in order that the charge rate meets the design requirement during high-frequency driving, small pixel electrodes need to be designed to reduce the storage capacitance Cst, but the shortcoming lies in that the pixel electrodes are small during high-frequency driving and the aperture ratio is correspondingly reduced. If the display device provided by the embodiment of the present invention is driven at high frequency, electrical connection between the third electrode layer 33 and the second electrode layer 42 may be cut off, so that the storage capacitance Cst is reduced to ensure the charge rate while the aperture ratio is not reduced. For example, in this embodiment, a control switch (not shown in the figures) may be provided for the whole display device between the third electrode layer 33 and the second electrode layer 42, so that when the display device is switched between high-frequency driving and low-frequency driving, the control switch is turned on or off based on a control signal to change the storage capacitance Cst, and the aperture ratio is not changed at the same time.

Preferably, in this embodiment, the first substrate 30 is a color filter substrate, and the insulation layer 34 is a color filter layer. As shown in FIG. 2, in a first specific implementation of this embodiment, the color filter layer is arranged between the first electrode layer 32 and the third electrode layer 33, and serves as an insulation layer to space the first electrode layer 32 and the third electrode layer 33. Of course, the color filter layer and the insulation layer may also be separately arranged, e.g. the first electrode layer 32, the insulation layer and the third electrode layer 33 are sequentially arranged to form a sandwich structure, and the color filter layer 2 is positioned above or below the sandwich structure.

The color filter layer generally includes a black matrix and color resisting blocks spaced by the black matrix. For a common RGB (red/green/blue) color mixing scheme, a pixel area generally includes three color resisting blocks of R/G/B (red/green/blue). Besides the common RGB (red/green/blue) color mixing scheme, the technical solutions of the present invention may also be used for other color mixing schemes, e.g. RGBY (red/green/blue/yellow) and RGBW (red/green/blue/white) color mixing schemes.

It needs to be further described in detail that, in the first specific implementation of this embodiment, the first electrode layer 32 on the first substrate 30 is a common electrode layer on which a plate-type common electrode is arranged; and the second substrate 40 is an array substrate, the second electrode layer 42 on the second substrate 40 is electrically connected with the third electrode layer 33 on the first substrate 30, and both the second electrode layer 42 and the third electrode layer 33 are pixel electrode layers, wherein slit-shape pixel electrodes are arranged on the second electrode layer 42, and a plate-type pixel electrode is arranged on the third electrode layer 33.

The structure of the color filter substrate is improved in this embodiment. A layer of transparent conductive film is further added in the structure including the color filter layer and a transparent conductive film, and the added transparent conductive film (namely the third electrode layer) is electrically connected with the pixel electrode layer of the array substrate, so that the storage capacitance of the display device is increased, and the display device is suitable for being driven at low frequency.

The implementation of connecting the third electrode layer 33 with the second electrode layer 42 is not limited in the embodiment of the present invention, and may be a random one known by those skilled in the art. But preferably, in this embodiment, the third electrode layer 33 may be connected with the second electrode layer 42 through a conductive spacer, and the spacer is arranged between the first substrate 30 and the second substrate 40 and used for maintaining the distance between the first substrate 30 and the second substrate 40.

Figure 3:
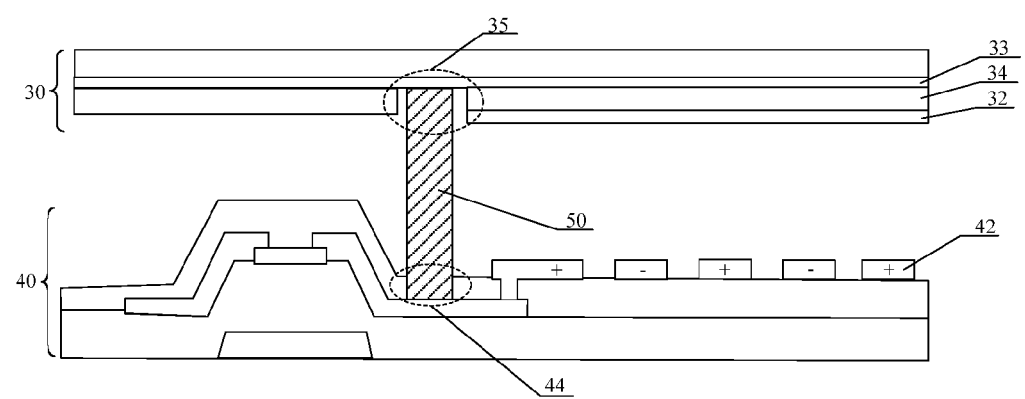
FIG. 3 is a second structural schematic diagram of the display device provided by the embodiment of the present invention.

FIG. 3 shows a second specific implementation of this embodiment, the first substrate 30 is provided with a via hole 35 penetrating through the first electrode layer 32 and the insulation layer 34 (e.g. the color filter layer), and one end of the spacer 50 is connected to the third electrode layer 33 through the via hole 35; and a thin film transistor connected with a pixel electrode (the second electrode layer 42 is a pixel electrode layer) is arranged on the second substrate 40, a drain via hole 44 is formed above a drain of the thin film transistor, and the other end of the spacer 50 penetrates through the drain via hole 44 and is connected with the drain of the thin film transistor. The spacer 50 is conductive, so that the third electrode layer 33 is connected with the pixel electrode together; and a first capacitor C1st is formed between the pixel electrode on the second substrate and the third electrode layer 33, a second capacitor C2st is formed between the first electrode layer 32 and the third electrode layer 33, and the first capacitor C1st is connected in parallel with the second capacitor C2st to form storage capacitance C1st+C2st altogether, so that the storage capacitance of the display device of this embodiment is increased to C1st+C2st and the display device is suitable for being driven at low frequency.

The first electrode layer 32, the second electrode layer 42 and the third electrode layer 33 are all transparent conductive films, and the transparent conductive films are commonly made of indium tin oxide (ITO), zinc oxide (ZnO), tin oxide (SnO2), aluminum-doped zinc oxide (AZO) and FTO (fluorine-doped tin oxide).

Moreover, the lower the total thickness of the electrode layers of a display area is, the better the transmittance is. There are only two electrode layers in the prior art, whereas the third electrode layer is further added on the first substrate in the embodiment of the present invention, so the thickness of each electrode layer needs to be reduced to prevent the overall transmittance of the display device from being reduced by the further added third electrode layer.

Generally, in the prior art, the thickness of an electrode layer is generally about 400 Å when a plate-type electrode is formed, and the thickness of an electrode layer is generally about 600 Å when slit electrodes are formed. Thus, the total thickness of the first electrode layer, the second electrode layer and the third electrode layer is less than 1,000 Å, which may generally ensure that the overall transmittance of the display device is not reduced.

In conclusion, the display device in the embodiment of the present invention is suitable for being driven at low frequency due to high storage capacitance, and the aperture ratio is prevented from being reduced as a result of ensuring the charge rate during high-frequency driving. The display device may be any product or component with a display function such as a liquid crystal panel, electronic paper, an OLED panel, a mobile phone, a flat computer, a television, a display, a notebook computer, a digital photo frame, a navigator or the like.

The manufacturing method of the display device is roughly the same as that in the prior art and includes a first substrate manufacturing process, a second substrate manufacturing process and a assembling process of assembling the first substrate and the second substrate with each other to form a cell, except that a procedure of forming a transparent conductive film is added in the first substrate manufacturing process, and the manufacturing method specifically includes the following steps:

step 1, forming a third electrode layer on a substrate;
step 2, forming an insulation layer on the substrate on which the third electrode layer is arranged;
step 3, forming a first electrode layer on the substrate on which the third electrode layer and the insulation layer are arranged, and forming a via hole by a patterning process, wherein the via hole penetrates through the first electrode layer and the insulation layer.

In the first substrate manufacturing process of this embodiment, a layer of transparent conductive film is further formed in the structure including the color filter layer and the transparent conductive film, and the added transparent conductive film (namely the third electrode layer) is electrically connected with the second electrode layer of the second substrate by using the conductive spacer. Different from the existing design concept, this embodiment focuses on low-frequency driving at the beginning of design, may satisfy low-frequency driving and high-frequency driving simultaneously, and ensures that the aperture ratio is not reduced under the condition of high-frequency driving.

It should be noted that, the technical features in the embodiment of the present invention may be randomly combined for use without conflicts.

The foregoing descriptions are merely specific implementations of the present invention, rather than limiting the protection scope of the present invention. Any skilled one who is familiar with this art could readily think of variations or substitutions within the disclosed technical scope of the present invention, and these variations or substitutions shall fall within the protection scope of the present invention. Accordingly, the protection scope of the claims should prevail over the protection scope of the present invention.

The invention claimed is:

1. A display device, comprising a first substrate and a second substrate which are assembled with each other to form a cell, the first substrate comprising a first electrode layer, the second substrate comprising a second electrode layer, wherein the first substrate further comprises a third electrode layer disposed on one side of the first electrode layer away from the second substrate, and an insulation layer is provided between the third electrode layer and the first electrode layer, and the third electrode layer is detachably connected with the second electrode layer under control of a switch provided therebetween, and the switch is turned off to reduce a storage capacitance of the display device when the display device is driven at a frequency of 60 Hz or 120 Hz.

2. The display device of claim 1, wherein the first substrate is a color filter substrate, and the insulation layer is a color filter layer.

3. The display device of claim 2, wherein the color filter layer comprises a black matrix and color resisting blocks spaced by the black matrix.

4. The display device of claim 1, wherein,
the display device further comprises a conductive spacer, and the third electrode layer is electrically connected with the second electrode layer through the spacer.

5. The display device of claim 4, wherein,
the first substrate is provided with a via hole penetrating through the first electrode layer and the insulation layer, and the spacer is connected to the third electrode layer through the via hole.

6. The display device of claim 1, wherein,
the second electrode layer is provided with slit electrodes.

7. The display device of claim 1, wherein,
the second electrode layer is provided with slit electrodes.

8. The display device of claim 2, wherein,
the second electrode layer is provided with slit electrodes.

9. The display device of claim 3, wherein,
the second electrode layer is provided with slit electrodes.

10. The display device of claim 4, wherein,
the second electrode layer is provided with slit electrodes.

11. The display device of claim 5, wherein,
the second electrode layer is provided with slit electrodes.

12. The display device of claim 6, wherein,
the second electrode layer is a pixel electrode layer, and the slit electrodes are pixel electrodes.

13. The display device of claim 12, wherein the second substrate is also provided with thin film transistors connected with the pixel electrodes;
the first electrode layer is connected with drains of the thin film transistors through the spacer.

14. The display device of claim 1, wherein,
the first electrode layer, the second electrode layer and the third electrode layer are all transparent conductive films.

15. The display device of claim 1, wherein,
the total thickness of the first electrode layer, the second electrode layer and the third electrode layer is less than 1,000 Å.

* * * * *